(12) United States Patent
Katou et al.

(10) Patent No.: US 6,763,922 B2
(45) Date of Patent: Jul. 20, 2004

(54) CLUTCH ENGAGING AND DISENGAGING APPARATUS

(75) Inventors: Masahiro Katou, Osaka (JP); Yasuhiko Eguchi, Yao (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/321,554

(22) Filed: Dec. 18, 2002

(65) Prior Publication Data

US 2003/0121749 A1 Jul. 3, 2003

(30) Foreign Application Priority Data

Dec. 27, 2001 (JP) ........................................ 2001-396533

(51) Int. Cl.[7] .............................................. F16D 25/08
(52) U.S. Cl. ...................... 192/85 C; 192/84.6; 192/90; 192/91 R
(58) Field of Search .............................. 192/84.6, 85 C, 192/90, 91 R

(56) References Cited

U.S. PATENT DOCUMENTS 4,852,419 A * 8/1989 Kittel et al. ............... 74/89.14
5,680,916 A * 10/1997 Borschert et al. ............. 192/20
6,000,517 A * 12/1999 Imao ...................... 192/85 CA
6,032,776 A * 3/2000 Imao .......................... 192/84.6
6,450,311 B2 * 9/2002 Goto et al. .................... 192/20

FOREIGN PATENT DOCUMENTS

| JP | 10-119603 A | 5/1998 |
| JP | 11-201188 A | 7/1999 |

* cited by examiner

Primary Examiner—Richard M. Lorence
(74) Attorney, Agent, or Firm—Shinjyu Global IP Counselors, LLP

(57) ABSTRACT

A clutch engaging and disengaging apparatus 1 is provided with a motor 2, a motion converting mechanism 3 that converts the rotational motion of the motor 2 into linear motion, a load storing mechanism 4 that stores a load when the motion converting mechanism 3 moves linearly in one direction and releases the stored load when the motion converting mechanism 3 moves linearly in the opposite direction, and a hydraulic mechanism 6 that uses the linear motion of the motion converting mechanism to produce hydraulic pressure and engage or disengage the clutch. The load storing mechanism 4 has an assist spring 41 that is coupled to the motion converting mechanism 3 and can extend and contract in response to the linear motion of the motion converting mechanism 3 and a spring cover 44 that supports an axially facing end part of the assist spring 41.

22 Claims, 3 Drawing Sheets

CLUTCH ENGAGING AND DISENGAGING APPARATUS

BACKGROUND OF THE INVENTION

1. Field of the Invention

The present invention relates to a clutch engaging and disengaging apparatus. More specifically, the present invention relates to a clutch engaging and disengaging apparatus that engages and disengages a clutch by utilizing the rotation of a driving mechanism.

2. Background Information

Among clutch engaging and disengaging apparatuses for vehicle clutches, there are apparatuses that operate a clutch by using the rotation of a motor (i.e., driving mechanism) to produce hydraulic pressure and to transmit the hydraulic pressure to a slave cylinder.

Examples of this type of clutch engaging and disengaging apparatus are the devices presented in Laid-Open Japanese Patent Publication No. 10-119603 and Laid-Open Japanese Patent Publication No. 11-201188. These clutch engaging and disengaging apparatuses are provided with a driving mechanism, a motion converting mechanism, a hydraulic mechanism, and a load storing mechanism. The driving mechanism has a motor that generates torque. The motion converting mechanism converts the rotational motion of the motor into a linear motion. The hydraulic mechanism uses the linear motion of the motion converting mechanism to produce hydraulic pressure and engage or disengage the clutch. The load storing mechanism has a coil spring that stores a load when the motion converting mechanism moves linearly in one direction and releases the stored load when the motion converting mechanism moves linearly in the opposite direction. The motion converting mechanism is provided with a reduction mechanism and a push rod. The reduction mechanism has a worm gear that is rotated by the motor and a worm wheel that meshes with the worm gear. The push rod moves linearly in response to the rotation of the worm wheel. The hydraulic mechanism is provided with a master cylinder that produces hydraulic pressure and a tandem cylinder that transfers the hydraulic pressure generated in the master cylinder to a slave cylinder. The master cylinder is provided with a piston that is pushed by one end of the push rod.

With this type of clutch engaging and disengaging apparatus, the motor is rotated in the reverse (or forward) direction to engage the clutch. When this is done, the motion converting mechanism moves linearly in one direction and the coil spring of the load storing mechanism stores the load as an elastic force. Since the push rod does not push the piston, the master cylinder does not produce hydraulic pressure and the clutch engages. Conversely, the motor is rotated in the forward (or reverse) direction to disengage the clutch. When this is done, the motion converting mechanism moves linearly in the opposite direction and causes the push rod to push the piston. Here, the coil spring of the load storing mechanism releases the load it stored as an elastic force when the motor rotates in the reverse (or forward) direction and assists in causing the push rod to push the piston. As a result, hydraulic pressure is produced in the master cylinder and the clutch disengages.

In the clutch engaging and disengaging apparatuses just described, the radially outside portion of the coil spring of the load storing mechanism is supported by a guide member such that it can extend and contract in a straight manner with respect to the direction in which the load is stored and released. Consequently, the number of parts making up the load storing mechanism is relatively large.

Also, the linkage part between the push rod and the worm wheel swings in response to the rotation of the worm wheel. This swinging motion causes the end of the push rod to move linearly with respect to the piston. The push rod is not always straight with respect to the direction in which it pushes the piston and, consequently, the end of the push rod touches against the piston at a slant due to the swing motion of the linkage part between the push rod and the worm wheel. Thus, in addition to the load in the direction in which the piston is being pushed, another load also acts on the piston in a direction perpendicular to the pushing direction. As a result, the lateral surfaces of the piston undergo wear.

In view of the above, there exists a need for a clutch engaging and disengaging apparatus which overcomes the above mentioned problems in the prior art. This invention addresses this need in the prior art as well as other needs, which will become apparent to those skilled in the art from this disclosure.

SUMMARY OF THE INVENTION

An object of the present invention is to reduce the number of parts in a clutch engaging and disengaging apparatus that engages and disengages a clutch using the rotation of a driving mechanism. Another object is to reduce piston wear in a clutch engaging and disengaging apparatus that engages and disengages a clutch using the rotation of a driving mechanism.

In accordance with a first aspect of the present invention a clutch engaging and disengaging apparatus that engages and disengages a clutch using the rotation of a driving mechanism is provided. The apparatus has a motion converting mechanism, a load storing mechanism, and a hydraulic mechanism. The motion converting mechanism converts the rotational motion of the driving mechanism into linear motion. The load storing mechanism stores a load when the motion converting mechanism moves linearly in one direction and releases the stored load when the motion converting mechanism moves linearly in the opposite direction. The hydraulic mechanism uses the linear motion of the motion converting mechanism to produce hydraulic pressure and engage or disengage the clutch. The load storing mechanism has a spring that is connected to the motion converting mechanism and can extend and contract in response to the linear motion of the motion converting mechanism. Further, the load storing mechanism has a support member that supports an axially facing end part of the spring.

With this clutch engaging and disengaging apparatus, an axially facing end of the spring of the load storing mechanism is supported by a support member but the axially facing end is not supported in a direction perpendicular to the direction in which the spring extends and contracts. In short, the guide member used in conventional load storing mechanisms to support the radially outside portion of the spring in directions perpendicular to the extension and contraction directions has been omitted. As a result, the number of parts making up the clutch engaging and disengaging apparatus can be reduced.

A clutch engaging and disengaging apparatus in accordance with a second aspect of the present invention is the apparatus of the first aspect, wherein the motion converting mechanism has a reduction mechanism that reduces the speed of the rotational motion of the driving mechanism and a push rod that receives a load transmitted from the reduction mechanism. The hydraulic mechanism has a piston that is pushed by one end of the push rod.

A clutch engaging and disengaging apparatus in accordance with a third aspect of the present invention is the apparatus of the second aspect, wherein the spring is arranged such that when one end of the push rod pushes the piston, the spring can apply a canceling load that can cancel out a load acting at the one end in a direction perpendicular to the direction in which the piston is pushed.

With this clutch engaging and disengaging apparatus, the rotation of the driving mechanism is converted into linear motion by the motion converting mechanism and the piston is pushed by one end of the push rod of the motion converting mechanism. A linkage part between the push rod and the reduction mechanism swings. The swinging motion causes the one end of the push rod to move linearly with respect to the piston. The push rod is not always straight with respect to the direction in which it pushes the piston and, consequently, the end of the push rod touches against the piston at a slant due to the swing motion of the linkage part between the push rod and the worm wheel. Thus, in addition to the load in the direction in which the piston is being pushed, another load also acts on the piston in a direction perpendicular to the pushing direction. This aspect is similar to that in conventional clutch engaging and disengaging apparatuses, but in the present invention the spring of the load storing mechanism is arranged such that when one end of the push rod pushes the piston, the spring can apply a canceling load that can cancel out a load acting at the one end in a direction perpendicular to the direction in which the piston is pushed. Consequently, loads applied from the push rod to the piston in a direction perpendicular to the direction in which the piston is being pushed are reduced. Therefore, piston wear can be reduced.

A clutch engaging and disengaging apparatus in accordance with a fourth aspect of the present invention is the apparatus of the second or third aspect, wherein the spring is supported by the other end of the push rod and is arranged on the opposite side of the push rod relative to the piston. Thus, the spring can push the other end toward the piston.

With this clutch engaging and disengaging apparatus, the spring of the load storing mechanism can be extended and contracted along the same direction as the direction in which the push rod pushes the piston. Consequently, when the push rod pushes the piston, the load stored in the spring can be released smoothly.

A clutch engaging and disengaging apparatus in accordance with a fifth aspect of the present invention is the apparatus of any of the second to fourth aspects, wherein the reduction mechanism has a worm gear that is rotated by the driving mechanism and a worm wheel that meshes with the worm gear.

With this clutch engaging and disengaging apparatus, the rotational motion of the driving mechanism is transmitted to the push rod using a reduction mechanism having a worm gear and a worm wheel. Consequently, even if the driving mechanism stops and an opposing torque is imparted to the worm wheel from the hydraulic mechanism and the load storing mechanism, the worm wheel will remain locked due to its meshing with the worm gear and the position of the push rod can be maintained.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
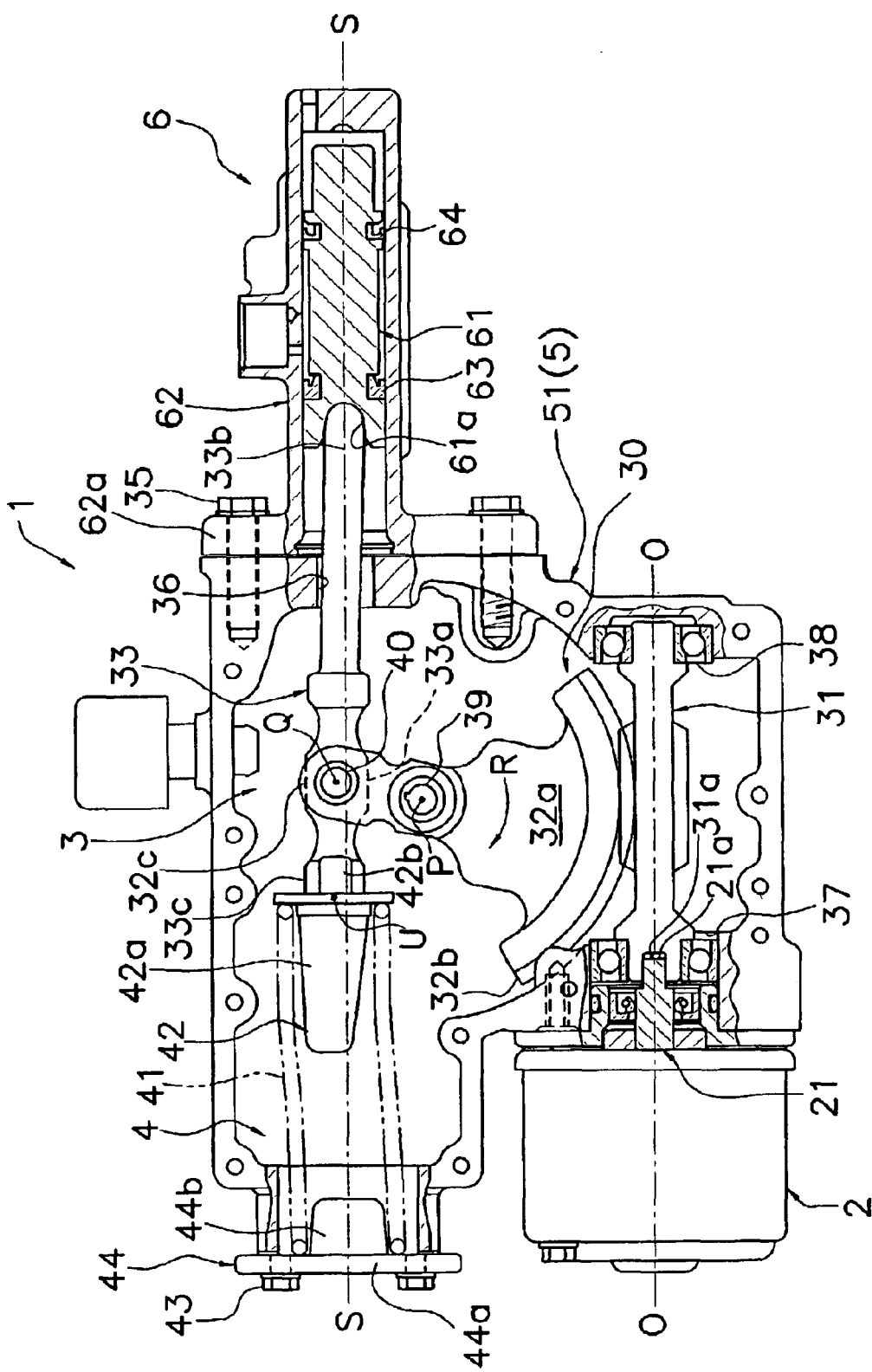
FIG. 1 is a lateral cross-sectional view of a clutch engaging and disengaging apparatus in accordance with a preferred embodiment of the present invention.

FIG. 1 shows a lateral cross sectional view of a clutch engaging and disengaging apparatus 1 in accordance with a preferred embodiment of the present invention.

(1) Constitution

A clutch engaging and disengaging apparatus 1 shown in FIG. 1 uses the rotational motion of a motor (driving mechanism) 2 to generate hydraulic pressure. The hydraulic pressure is transmitted to a slave cylinder (not shown), thus operating the clutch (not shown). The clutch engaging and disengaging apparatus 1 is provided with a motion converting mechanism 3, a hydraulic mechanism, and a load storage mechanism 4. The motion converting mechanism 3 converts the rotational motion of the motor 2 into linear motion. The hydraulic mechanism engages and disengages the clutch in accordance with the linear motion of the motion converting mechanism 3. The load storage mechanism 4 stores a load when the motion converting mechanism 3 moves linearly in one direction and releases the stored load when the motion converting mechanism 3 moves linearly in the opposite direction.

A housing 5 serves to enclose the motion converting mechanism 3 and the load storing mechanism 4. The housing 5 has a housing main body 51 and a housing lid (not shown) that covers the lateral face of the housing main body 51. FIG. 1 shows the clutch engaging and disengaging apparatus 1 with the housing lid removed so that the inside of the housing 5 can be seen.

The motor 2 has a motor shaft 21 that is connected to an end part of a worm gear 31 (discussed later). A mating part 21a having at least two flat, parallel faces extending in the axial direction is formed on a tip of the motor shaft 21 opposite the motor 2. The motor 2 can rotate in both the forward and reverse directions. Line O—O in the figure is the rotational axis of the motor 2.

Motion Converting Mechanism

The motion converting mechanism 3 is provided with a reduction mechanism 30 and a push rod 33. The reduction mechanism 30 reduces the speed of the rotational motion of the motor 2. The push rod 33 is connected to the reduction mechanism 30 and moves substantially linearly. The reduction mechanism 30 has the worm gear 31 that is rotated by the motor 2 and a worm wheel 32 that meshes with the worm gear 31.

The worm gear 31 has bearings 37 and 38 that are press fitted onto both ends thereof and are supported by the bottom of the housing 5. Then end of the worm gear 31 facing the motor 2 is provided with a recessed part 31a into which the mating part 21a of the motor 2 fits from the axial direction. Thus, the worm gear 31 is supported on the bottom of the housing 5 such that it can rotate about axis O—O and is driven rotationally by the motor 2.

The worm wheel 32 is a gear that serves to convert the rotational motion of the worm gear 31 about axis O—O into rotational motion about axis P. The worm wheel 32 has a fan-shaped worm wheel main body 32a, an arc-shaped gear part 32b and a rod coupling part 32c. The main body 32a is supported on the housing 5 via a wheel shaft 39 such that it can pivot about axis P. The arc-shaped gear part 32b meshes with the worm gear 31. The rod coupling part 32c extends in an opposite direction from axis P relative to the main body 32a and couples with the push rod 33.

The push rod 33 is a rod-shaped member that is coupled to the rod coupling part 32c of the worm wheel 32 and moves substantially linearly when the worm wheel 32 moves rotationally about axis P. The push rod 33 has a wheel coupling part 33a, a front end part 33b, and a rear end part 33c. The wheel coupling part 33a is coupled to the rod coupling part 32c of the worm wheel 32 by a rod pin 40 such that it can pivot about axis Q. The front end part 33b touches against the end of a piston 61 facing the push rod 33 and transmits linear motion to the piston 61. The rear end part 33c is coupled to the load storing mechanism 4 (discussed later) and extends in a direction opposite from axis Q relative to the front end part 33b. The wheel coupling part 33a undergoes swinging motion in response to the rotation of the worm wheel 32 and this swinging motion causes the front end part 33b of the push rod 33 to move substantially linearly.

Hydraulic Mechanism

The hydraulic mechanism is provided with a master cylinder 6 that produces hydraulic pressure when the front end part 33b of the push rod 33 pushes the piston 61 and a tandem cylinder (not shown) that serves to transmit the hydraulic pressure produced by the master cylinder 6 to a slave cylinder. The master cylinder 6 chiefly has a circular cylinder 62 and the piston 61. The circular cylinder 62 is arranged on the side of the housing 5 where the front end part 33b of the push rod 33 is located. The piston 61 is arranged inside the cylinder 62 with seal rings 63 and 64 disposed therebetween. The cylinder 62 has a flange part 62a formed on the end thereof that faces the push rod 33. The flange part 62a preferably extends substantially perpendicularly to a center axis S—S of the piston 61. The flange part 62a is fixed to the side face of the housing 5 by a plurality of bolts 35. The front end part 33b of the push rod 33 is inserted into the cylinder 62 through a hole 36 formed in the side of the housing 5 facing the master cylinder 6.

The piston 61 is a solid cylindrical member inserted inside the cylinder 62. The piston 61 has a recessed part 61a against which the front end part 33b of the push rod 33 can touch. The front end part 33b of the push rod 33 touches the piston 61 at a slant with respect to the pushing direction because axis Q, which is the fulcrum of the linear motion of the push rod 33, is displaced from center axis S—S of the piston 61 (more specifically, displaced in the upward direction in the view shown in FIG. 1). Consequently, when the front end part 33b of the push rod 33 pushes the piston 61, a load oriented in a direction perpendicular to center axis S—S of the piston 61 acts in addition to the load oriented coincidentally to the center axis S—S of the piston 61.

Load Storing Mechanism

The load storing mechanism 4 has an assist spring 41 (spring), a spring cover 44 (support member) and a spring seat 42. The spring cover 44 supports one end of the assist spring 41. The spring seat 42 (support member) supports the other end of the assist spring 41 and serves to couple the assist spring 41 to the rear end part 33c of the push rod 33.

The assist spring 41 is, for example, a coil spring that stores a load when the push rod 33 moves linearly in the opposite direction of the piston 61 and releases the stored load when the push rod 33 moves linearly toward the piston 61. The assist spring 41 is arranged on the side opposite of the push rod 33 relative to the piston 61 so that it can extend and contract along the same direction as the direction in which the push rod 33 pushes the piston 61.

The spring cover 44 serves to support the end part of the assist spring 41 that is farther from the piston 61. The spring cover 44 has a plate-shaped cover main body 44a and a protruding part 44b that extends inside the coil of the assist spring 41 at the end thereof that is farther from the piston 61. The cover main body 44a is fixed to the side face of the housing 5 with a plurality of bolts 43. The spring cover 44 is fixed to the housing main body 51 in such a manner that the coil center of the assist spring 41 at the end thereof that is farther from the piston 61 is positioned on center axis S—S of the piston 61.

The spring seat 42 is a roughly circular cone-shaped member serving to support the end of the assist spring 41 that is closer to the piston 61. The spring seat 42 has a protruding part 42a that extends inside the coils of the assist spring 41 at the end thereof that is closer to the piston 61 and a protruding mating part 42b that is formed on the side of the protruding part 42a that is closer to the piston 61. The mating part 42b is press fitted and thereby fixed in a recessed part formed in the rear end part 33c of the push rod 33. Since axis Q is displaced from axis S—S, the coil center U of the assist spring 41 at the end thereof that is closer to the push rod 33 is displaced from axis S—S. Meanwhile, the coil center of the assist spring 41 at the end thereof that is farther from the piston 61 is positioned on the center axis S—S of the piston 61. Consequently, the assist spring 41 is deformed in the radial direction of the coils (i.e., deformed in the upward direction in the view shown in FIG. 1) by an amount corresponding to the amount by which axis Q is displaced from center axis S—S.

(2) Operation

Figure 2:
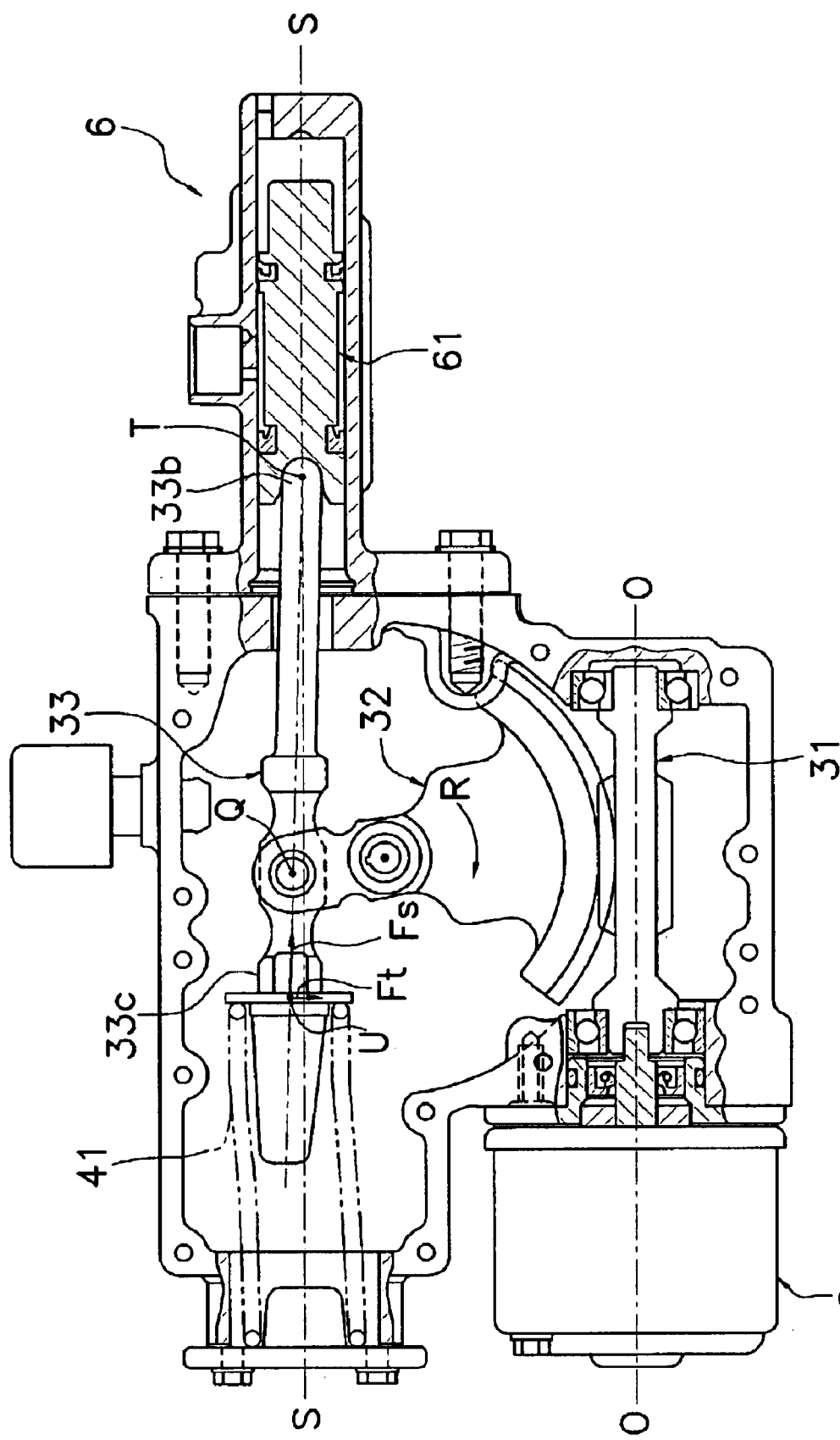
FIG. 2 is a lateral cross-sectional view of the clutch engaging and disengaging apparatus illustrating a state in which a load is stored in a load storing mechanism.
Figure 3:
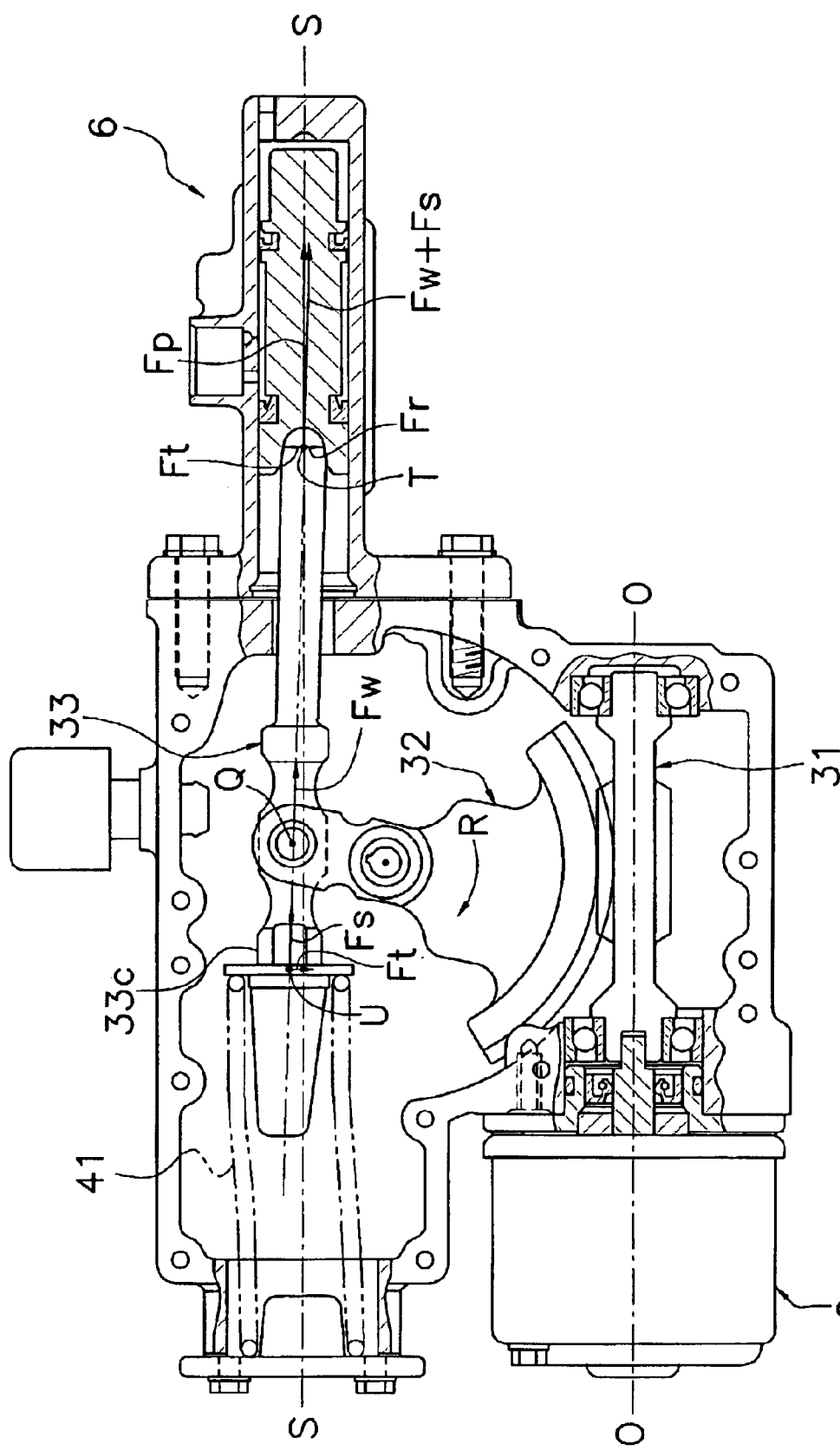
FIG. 3 is a lateral cross-sectional view of the clutch engaging and disengaging apparatus illustrating a state in which a piston of a master cylinder has been pushed by a push rod.

The operation of the clutch engaging and disengaging apparatus 1 is explained based on FIGS. 1 to 3. Here, the forward rotational direction of the worm wheel 32 (i.e., the direction causing the push rod 33 to move linearly and push against the piston 61) is called rotational direction R. The forward rotational directions of the motor 2 and the worm gear 31 are also defined to correspond to when the worm wheel 32 is rotated in rotational direction R.

First, assume the motor 2 is driven in the reverse direction. When this is done, as shown in FIG. 2, the rotation of the motor 2 is transmitted to the worm wheel 32 via worm gear 31 and the worm wheel 32 rotates in the opposite direction of rotational direction R. The resulting swing motion of the wheel coupling part 33a causes the push rod 33, which is coupled to the worm wheel 32 about axis Q, to move away from the piston 61 and compress the assist spring 41 of the load storing mechanism 4. Thus the force from the torque of the worm wheel 32 is stored in the assist spring 41. More specifically, the assist spring 41 stores the force from the torque of the worm wheel 32 as a load Fs that pushes the push rod 33 toward the piston 61 along coil center U. At the end of the assist spring 41 that contacts the push rod 33, the coil center U deviates from center axis S—S in response to the swing motion of axis Q (i.e., deviates upward in the view shown in FIG. 2) and, consequently, the assist spring 41 stores a load Ft that acts in the direction of returning coil center U to axis S—S. Since hydraulic pressure is not produced in the master cylinder 6 when the apparatus is in this state, the clutch enters the engaged state. Then, the motor 2 stops.

Next, assume the motor 2 is driven in the forward direction. When this is done, as shown in FIG. 3, the rotation of the motor 2 is transmitted to the worm wheel 32 via the worm gear 31 and the worm wheel 32 rotates in rotational direction R. The resulting swing motion of the wheel coupling part 33a causes the push rod 33, which is coupled to the worm wheel 32 about axis Q, to move toward the piston 61. As a result, the following two forces act on the front end part 33a of the push rod 33: a load Fw that is caused by the rotation of the worm wheel 32 and pushes the push rod 33 and a load Fs that was stored in the assist spring 41 of the load storing mechanism 4. Since axis Q is displaced from axis S—S, the load (Fw+Fs) acting on the piston 61 at point T of the front end part 33b of the push rod 33 can be resolved into a load component Fp in a direction coinciding with axis S—S and load component Fr in a direction perpendicular to axis S—S (downward direction in FIG. 3). However, load Ft, which acts in the direction of returning the end of the assist spring 41 that contacts the push rod 33 to axis S—S, exists at the rear end part 33c of the push rod 33. Load Ft acts as a canceling load that can cancel out load Fr at the front end part 33b of the push rod 33. Therefore, the only force acting at the front end part 33b of the push rod 33 in a direction perpendicular to axis S—S is the difference between load Fr and load Ft. In this state, hydraulic pressure is produced in the master cylinder 6 and the clutch (not shown) enters the disengaged (released) state.

(3) Constituent Features

① Reduction of the Number of Parts

This embodiment of the clutch engaging and disengaging apparatus 1 eliminates the guide member that is conventionally provided around the radially outside portion of the assist spring of the load storing mechanism. This allows the number of parts to be reduced.

② Reduction of Piston Wear

In this embodiment of the clutch engaging and disengaging apparatus 1, the assist spring 41 of the load storing mechanism 4 is arranged such that it can push the rear end part 33c of the push rod 33 axially toward the piston 61. Additionally, since the guide member conventionally provided around the outside portion of the assist spring 41 is omitted, the assist spring 41 can deform in the radial direction of the coils by an amount corresponding to the amount by which axis Q of the push rod 33 is displaced from center axis S—S. Thus, when coil center U is displaced, the resulting deformation of the assist spring 41 in the radial direction of the coils causes a load Ft (canceling load) to develop in the assist spring 41 in the direction of returning to axis S—S. This canceling load can cancel out the load Fr, which occurs at the front end part 33b of the push rod 33 due to the displacement of axis Q and acts in a direction perpendicular to the axial direction of the push rod 33. This arrangement reduces the magnitude of the perpendicular load (i.e., the load that acts in a direction perpendicular to the center axis of the piston 61) that exists when the push rod 33 pushes the piston 61 and allows the wear of the piston 61 to be reduced.

The magnitude of load Ft can be adjusted by changing the displacement position of coil center U with respect to axis S—S and changing the position at which the end of the assist spring 41 that is farther from the piston 61 is supported. For example, when load Fr at the front end part 33b of the push rod 33 is relatively large, the magnitude of load Ft can be increased by displacing with respect to axis S—S the position where the end of the assist spring 41 that is farther from the piston 61 is supported such that the deformation of the assist spring 41 increases (e.g., displace the support position downward in FIG. 3). Conversely, when load Fr at the front end part 33b of the push rod 33 is relatively small, the magnitude of load Ft can be decreased by displacing with respect to axis S—S the position where the end of the assist spring 41 that is farther from the piston 61 is supported such that the deformation of the assist spring 41 decreases (e.g., displacing the support position upward in FIG. 3), so long as the support position is not moved beyond the displacement distance of coil center U with respect to axis S—S. Thus, an appropriate canceling load can be applied at the front end part 33b of the push rod 33 even when the positioning of the wheel coupling part 33a of the push rod 33 with respect to axis S—S is different from this embodiment or when the length of the push rod 33 is different.

③ Smooth Storage and Release of Load

In this embodiment of the clutch engaging and disengaging apparatus, the assist spring 41 of the load storing mechanism 4 can be extended and contracted along the same direction as the direction in which the push rod 33 pushes the piston 61.

④ Position of Push Rod can be Held when Motor Stops

In this embodiment of the clutch engaging and disengaging apparatus 1, the speed of rotational motion is reduced using the reduction mechanism 30 having the worm gear 31 and the worm wheel 32. Consequently, even if the motor 2 stops and an opposing torque is imparted to the worm wheel 32 from the hydraulic mechanism and the load storing mechanism 4, the worm wheel 32 will remain locked due to the meshing between the worm gear 31 and the worm wheel 32 and the position of the push rod 33 will be maintained.

EFFECTS OF THE INVENTION

The clutch engaging and disengaging apparatus of the present invention eliminates the guide member of the load storing mechanism and allows the number of parts to be reduced. Also, piston wear can be reduced because the magnitude of the force acting in a direction perpendicular to direction in which the piston is pushed can be reduced.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-396533. The entire disclosure of Japanese Patent Application No. 2001-396533 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch engaging and disengaging apparatus comprising:
    a driving mechanism being configured to rotate to engage and disengage a clutch with said clutch engaging and disengaging apparatus;
    a motion converting mechanism having a push rod having first and second ends, said motion converting mechanism being configured to convert rotational motion of said driving mechanism into linear motion;
    a load storing mechanism being configured to store a load when said motion converting mechanism moves linearly in a first direction, said load storing mechanism being configured to release said load when said motion converting mechanism moves linearly in a second direction; and
    a hydraulic mechanism being configured to use said linear motion of said motion converting mechanism to produce hydraulic pressure and engage or disengage the clutch, said hydraulic mechanism being configured to be pushed by said first end of said push rod,
    said load storing mechanism having a spring being connected to said motion converting mechanism, said spring being extendable and compressible in response to said linear motion of said motion converting mechanism, said load storing mechanism having a support member being configured to support an axially facing end part of said spring, said spring being arranged on said second end of said push rod, and said spring being configured to push said rush rod toward said hydraulic mechanism.

2. The clutch engaging and disengaging apparatus according to claim 1, wherein said motion converting mechanism has a reduction mechanism that reduces the speed of the rotational motion of said driving mechanism, and
    said hydraulic mechanism has a piston that is pushed by said first end of said push rod on a first side of said push rod.

3. The clutch engaging and disengaging apparatus according to claim 2, wherein said reduction mechanism has a worm gear that is rotated by said driving mechanism and a worm wheel that meshes with said worm gear.

4. The clutch engaging and disengaging apparatus according to claim 2, wherein said spring is a coil spring that is deformable in a radial direction of coils of said coil spring.

5. The clutch engaging and disengaging apparatus according to claim 4, wherein said reduction mechanism includes,
    a worm gear that is rotated by said driving mechanism, and
    a worm wheel that meshes with said worm gear.

6. A clutch engaging and disengaging apparatus comprising:
    a driving mechanism being configured to rotate to engage and disengage a clutch with said clutch engaging and disengaging apparatus;
    a motion converting mechanism being configured to convert rotational motion of said driving mechanism into linear motion, said motion converting mechanism having,
        a reduction mechanism being configured to reduce the speed of the rotational motion of said driving mechanism, and
        a push rod being configured to receive a load transmitted from said reduction mechanism;
    a load storing mechanism being configured to store a load when said motion converting mechanism moves linearly in a first direction, said load storing mechanism being configured to release said load when said motion converting mechanism moves linearly in a second direction; and
    a hydraulic mechanism being configured to use said linear motion of said motion converting mechanism to produce hydraulic pressure and engage or disengage the clutch, said hydraulic mechanism having a piston being configured to be pushed by a first end of said push rod on a first side of said rush rod,
    said load storing mechanism having a spring being connected to said motion converting mechanism, said spring being extendable and compressible in response to said linear motion of said motion converting mechanism, said load storing mechanism having a support member being configured to support an axially facing end part of said spring, said spring being arranged to apply a canceling load to cancel a load acting at said first end in a direction perpendicular to the direction in which said piston is pushed when said first end of said push rod gushes said piston.

7. The clutch engaging and disengaging apparatus according to claim 6, wherein
    said spring is supported by a second end of said push rod and is arranged on a second side of said push rod, said second side being opposite said piston, said spring is configured to push said second end toward said piston.

8. The clutch engaging and disengaging apparatus according to claim 7, wherein said reduction mechanism has a worm gear that is rotated by said driving mechanism and a worm wheel that meshes with said worm gear.

9. The clutch engaging and disengaging apparatus according to claim 6, wherein said reduction mechanism has a worm gear that is rotated by said driving mechanism and a worm wheel that meshes with said worm gear.

10. The clutch engaging and disengaging apparatus according to claim 6, wherein
    said spring is is a coil spring that is deformable in a radial direction of coils of said coil spring.

11. The clutch engaging and disengaging apparatus according to claim 10, wherein said reduction mechanism has a worm gear that is rotated by said driving mechanism and a worm wheel that meshes with said worm gear.

12. A clutch engaging and disengaging apparatus comprising:
    a driving mechanism being configured to rotate to engage and disengage a clutch with said clutch engaging and disengaging apparatus;
    a motion converting mechanism having a push rod having first and second ends, said motion converting mechanism being configured to convert rotational motion of said driving mechanism into linear motion;
    a load storing mechanism being configured to store a load when said motion converting mechanism moves linearly in a first direction, said load storing mechanism being configured to release said load when said motion converting mechanism moves linearly in a second direction; and
    a hydraulic mechanism being configured to use said linear motion of said motion converting mechanism to produce hydraulic pressure and engage or disengage the clutch, said hydraulic mechanism being configured to be pushed by said first end of said push rod, said load storing mechanism having a spring being connected to said motion converting mechanism, said spring being extendable and compressible in response to said linear motion of said motion converting mechanism, said load storing mechanism having a spring seat being configured to support a first axially facing end part of said spring, said load storing mechanism having a spring cover being configured to support a second axially facing end part of said spring, said spring being arranged on said second end of said push rod, and said spring being configured to push said push rod toward said hydraulic mechanism.

13. The clutch engaging and disengaging apparatus according to claim 12, wherein said first axially facing end part is closer to said hydraulic mechanism than said second axially facing end part, said spring seat comprises a spring seat protruding part that extends inside said spring toward said second axially facing end part.

14. The clutch engaging and disengaging apparatus according to claim 13, wherein said spring cover has a spring cover protruding part that extends inside said spring toward said first axially facing end part.

15. The clutch engaging and disengaging apparatus according to claim 14, wherein said hydraulic mechanism comprises a circular cylinder and a piston that is arranged to move within said circular cylinder.

16. The clutch engaging and disengaging apparatus according to claim 15, wherein said motion converting mechanism comprises a reduction mechanism and said push rod that is configured to push said piston.

17. The clutch engaging and disengaging apparatus according to claim 16, wherein said reduction mechanism comprises a worm gear and a worm wheel that meshes with said worm gear, said worm gear is configured to rotate by said driving mechanism, said worm wheel is rotatably connected to said push rod at a first pivot point.

18. The clutch engaging and disengaging apparatus according to claim 17, wherein said worm wheel rotates relative to said worm gear at a second pivot point.

19. The clutch engaging and disengaging apparatus according to claim 18, further comprising a housing, said reduction mechanism is located in said housing, said second pivot point being immobile relative to said housing.

20. The clutch engaging and disengaging apparatus according to claim 17, wherein said worm wheel rotates relative to said worm gear at a second pivot point.

21. The clutch engaging and disengaging apparatus according to claim 20, further comprising a housing, said reduction mechanism is located in said housing, said second pivot point being immobile relative to said housing.

22. A clutch engaging and disengaging apparatus comprising:

a driving mechanism being configured to rotate to engage and disengage a clutch with said clutch engaging and disengaging apparatus;

a motion converting mechanism being configured to convert rotational motion of said driving mechanism into linear motion, said motion converting mechanism having a push rod;

a load storing mechanism being configured to store a load when said motion converting mechanism moves linearly in a first direction, said load storing mechanism being configured to release said load when said motion converting mechanism moves linearly in a second direction; and a hydraulic mechanism being configured to use said linear motion of said motion converting mechanism to produce hydraulic pressure and engage or disengage the clutch, said hydraulic mechanism having a piston being configured to be pushed by said push rod, said load storing mechanism having a spring being connected to said motion converting mechanism, said spring being extendable and compressible in response to said linear motion of said motion converting mechanism, said load storing mechanism having a spring seat being configured to support a first axially facing end part of said spring, said load storing mechanism having a spring cover being configured to support a second axially facing end part of said spring, said spring being configured to apply to cancel a load acting at an end of said push rod contacting said piston in a direction perpendicular to the direction in which said piston is pushed.

* * * * *